(12) United States Patent
Buter et al.

(10) Patent No.: US 6,376,575 B2
(45) Date of Patent: Apr. 23, 2002

(54) AQUEOUS COATING COMPOSITION COMPRISING AN ADDITION POLYMER AND A RHEOLOGY MODIFIER

(75) Inventors: Roelof Buter, Dieren; Andreas Henricus J. Roelofs, Arnhem, both of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/745,673

(22) Filed: Dec. 21, 2000

Related U.S. Application Data

(63) Continuation of application No. PCT/EP99/04340, filed on Jun. 22, 1999.

(30) Foreign Application Priority Data

Jun. 23, 1998 (EP) .............................................. 98111529

(51) Int. Cl.$^7$ ............................................. C09D 151/00
(52) U.S. Cl. ....................... 523/201; 523/501; 524/501; 524/522; 524/523; 525/66; 525/78; 525/79; 525/902
(58) Field of Search ................................ 523/201, 501; 524/501, 522, 523; 525/78, 79, 902, 66

(56) References Cited

U.S. PATENT DOCUMENTS

3,821,145 A    6/1974    Walus ................. 260/29.4 UA

FOREIGN PATENT DOCUMENTS

| EP | 0 038 127 | 10/1981 | ............ B05D/7/26 |
| EP | 0 287 144 | 10/1988 | ............ C09D/3/80 |
| EP | 287144 | * 10/1988 | ............ C09D/3/80 |
| EP | 0 292 004 | 11/1988 | ............ C09D/3/81 |
| GB | 870994 | * 6/1961 | |
| WO | WO 94/04581 | * 3/1994 | ......... C08F/265/06 |

\* cited by examiner

*Primary Examiner*—David W. Wu
*Assistant Examiner*—Kelechi Egwim
(74) *Attorney, Agent, or Firm*—Joan M. McGillycuddy

(57) ABSTRACT

An aqueous coating composition comprising a mixture of 90 to 99 wt. % of a filmforming binder composition comprising an alkali non-swellable core-shell addition polymer dispersion (I), and 1–10 wt. % of a rheology modifying addition polymer dispersion (II). It is required that the total amount of (meth)acrylic acid in 100 parts of the total addition polymer (I) is less than 1.75 wt. %. The aqueous coating composition of the present invention can be advantageously used as a base coat in a base coat/clear coat system. This use shows a decrease in strike-in effect compared to previous known base coat/clear coat systems.

14 Claims, No Drawings

AQUEOUS COATING COMPOSITION COMPRISING AN ADDITION POLYMER AND A RHEOLOGY MODIFIER

The present invention is a continuation of International Patent Application No. PCT/EP99/04340 filed on Jun. 22, 1999 and claims priority of European Patent Application No. 98111529.8 filed on Jun. 23, 1998.

FIELD OF THE INVENTION

The invention relates to an aqueous coating composition based on a mixture of a dispersion of an addition polymer and a rheology modifier. Preferably, this aqueous coating composition is mixed with a metallic pigment, such as aluminum, or a pigment, such as a metal oxide-coated mica, so that coatings with a metallic appearance may be obtained. In this way there is obtained a differential light reflection effect referred to as "flop". A problem with coating systems having a metallic appearance is to obtain a high flop as well as a high gloss.

BACKGROUND OF THE INVENTION

To obtain a high flop, the metallic pigment on application of the coating composition should be and remain well oriented. To obtain a high gloss, the metallic pigment-containing coating is provided with an unpigmented, so-called clear coat. This system is generally called a "base coat/clear coat" system. In actual practice, the base coat will be sprayed with the clear coat, without prior curing of the base coat ("wet-on-wet"). Since the clear coat usually contains organic solvents, steps should be taken to prevent disorientation of the metallic pigment in the base coat as a result of the base coat being weakened up by the organic solvents in the clear coat ("strike-in").

An aqueous base coat composition is known from EP-A-0 038 127, i.e., a crosslinked core-shell dispersion whereby the shell, when swollen, provides the desired rheological properties. The crosslinking reduces the strike-in. A disadvantage to this system, however, is that the coating composition will have poor film-forming properties, which may manifest itself in poor mechanical properties.

Another aqueous base coat composition is known from EP-A-0 287 144, i.e., a swellable non-crosslinked core-shell dispersion having an amount of (meth)acrylic acid in the shell of 10–60 mole %. Exemplified are swellable non-crosslinked core-shell dispersions having more than 2 wt. % (meth)acrylic acid in 100 parts of the addition polymer. Also in this embodiment a decrease in strike-in is observed.

Both systems disclosed in EP-A-0 038 127 and EP-A-0 287 144 contain in the shell a lot of carboxylic groups, neutralized by an amine to provide the desired rheological properties. However, because of this large amount of salt groups, coatings based on these compositions especially when applied and cured at ambient temperature, show a poor water-resistance.

SUMMARY OF THE INVENTION

The present invention now provides an aqueous coating composition which may be used as base coat in a base coat/clear coat system, having good mechanical properties, a high flop, a high gloss, practically no strike-in, and a good water-resistance. Due to the fact that higher solid contents can be achieved with the aqueous coating composition of the present invention, a reduction in drying times and number of coats is obtained. In one or more of these properties the aqueous coating composition of the present invention shows improvement over those disclosed in EP-A-0 038 127 and EP-A-0 287 144.

The aqueous coating composition according to the invention comprises a mixture of
90 to 99 wt. % of a filmforming binder composition comprising an alkali non-swellable core-shell addition polymer dispersion (I), and
1–10 wt. % of a rheology modifying addition polymer dispersion (II),
the sum of the wt. % indicated for the filmforming binder composition and dispersion (II) always being 100 wt. %, wherein
the polymer dispersion (I) is prepared in two or more steps by emulsion polymerization, and obtained by copolymerization in a first step of
(1) 60–95 parts by weight (calculated on 100 parts by weight of the total addition polymer (I)) of a monomer mixture A consisting of
    (i) 65–100 mole % of a mixture of
        (a) 10–98 mole % of a (cyclo)alkyl (meth)acrylate of which the (cyclo)alkyl group contains 4–12 carbon atoms,
        (b) 0–55 mole % styrene,
        (c) 2–15 mole % hydroxy alkyl (meth)acrylate, and
        (d) 0–20 mole % of a di(cyclo)alkyl maleate and/or fumarate of which the (cyclo)alkyl groups contain 4–12 carbon atoms,
        the sum of the mole % indicated for the monomers (a), (b), (c), and (d) always being 100 mole %, and
    (ii) 0–35 mole % of a different copolymerizable monoethylenically unsaturated monomer,
    the sum of the mole % indicated for the components (i) and (ii) always being 100 mole %,
and by copolymerization in a subsequent step of
(2) 5–40 parts by weight (calculated on 100 parts by weight of the total addition polymer (I)) of a monomer mixture B consisting of
    (e) 1–10 mole % (meth)acrylic acid,
    (f) 2–20 mole % hydroxy alkyl (meth)acrylate,
    (g) 0–55 mole % styrene, and
    (h) 15–97 mole % of a different copolymerizable monoethylenically unsaturated monomer,
    the sum of the mole % indicated for the monomers (e), (f), (g), and (h) always being 100 mole %,
with the carboxylic acid groups derived from the (meth)acrylic acid being at least partially neutralized, resulting in a non-crosslinked addition polymer I,
whereby the total amount of (meth)acrylic acid in 100 parts of the total addition polymer (I) is less than 1.75 wt. %, and wherein
the polymer dispersion (II) is prepared by emulsion polymerization, and obtained by copolymerization of
(iii) 99.5–99.99 parts by weight (calculated on 100 parts by weight of the total addition polymer (II)) of a monomer mixture C consisting of
    (j) 10–80 wt. % (cyclo)alkyl (meth)acrylate,
    (k) 20–50 wt. % (meth)acrylic acid,
    (m) 0–20 wt. % hydroxyalkyl (meth)acrylate, and
    (n) 0–20 wt. % of a different copolymerizable monoethylenically unsaturated monomer,
    the sum of the wt. % indicated for the monomers (j), (k), (m), and (n) always being 100 wt. %, and
(iv) 0.01–0.5 parts by weight (calculated on 100 parts by weight of the total addition polymer (II)) of a compound having at least two unsaturated groups, with the carboxylic acid groups derived from the (meth) acrylic acid being at least partially neutralized.

DETAILED DESCRIPTION OF THE INVENTION

Preferably, in the first step of the preparation of the polymer dispersion (I), a monomer mixture A is used, consisting of
- (i) 80–100 mole %, more preferred 100 mole %, of a mixture of
  - (a) 30–95 mole % of a (cyclo)alkyl (meth)acrylate of which the (cyclo)alkyl group contains 4–12 carbon atoms,
  - (b) 0–50 mole % styrene,
  - (c) 5–12 mole % hydroxy alkyl (meth)acrylate, and
  - (d) 0–8 mole % of a di(cyclo)alkyl maleate and/or fumarate of which the (cyclo)alkyl groups contain 4–12 carbon atoms, and
- (ii) 0–20 mole %, more preferred 0 mole %, of a different copolymerizable monoethylenically unsaturated monomer.

As examples of (cyclo)alkyl (meth)acrylates suitable for use in monomer mixture A and having a (cyclo)alkyl group with 4–12 carbon atoms may be mentioned: butyl acrylate, butyl methacrylate, 2-ethylhexyl acrylate, 2-ethylhexyl methacrylate, octyl acrylate, octyl methacrylate, isobornyl acrylate, isobornyl methacrylate, dodecyl acrylate, dodecyl methacrylate, cyclohexyl acrylate, cyclohexyl methacrylate, and mixtures thereof. Butyl acrylate, butyl methacrylate, and mixtures thereof are preferred.

Examples of hydroxyalkyl (meth)acrylates are 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, p-hydroxycyclohexyl methacrylate, hydroxypolyethylene glycol (meth)acrylates, hydroxypolypropylene glycol (meth)acrylates, and mixtures thereof. 2-Hydroxyethyl methacrylate is preferred.

As examples of di(cyclo)alkyl maleates and/or fumarates with the (cyclo)alkyl groups having 4–12 carbon atoms suitable for use in monomer mixture A may be mentioned dibutyl maleate, dibutyl fumarate, 2-ethylhexyl maleate, 2-ethylhexyl fumarate, octyl maleate, isobornyl maleate, dodecyl maleate, cyclohexyl maleate, and mixtures thereof.

As suitable copolymerizable monoethylenically unsaturated monomers to be used in monomer mixture A may be mentioned: alkyl (meth)acrylates having fewer than 4 carbon atoms in the alkyl group, such as methyl methacrylate, methyl acrylate, ethyl acrylate, ethyl methacrylate, propyl acrylate, propyl methacrylate, and isopropyl acrylate; alkyl maleates and fumarates having fewer than 4 carbon atoms in the alkyl groups, such as dimethyl maleate, diethyl maleate, diethyl fumarate, and dipropyl maleate; (meth)acrylates having ether groups such as 2-methoxyethyl methacrylate, 2-ethoxyethyl methacrylate, and 3-methoxypropyl acrylate; monovinyl aromatic hydrocarbons, such as vinyl toluene, α-methyl styrene, and vinyl naphthalene; acrylamide and methacrylamide; nitriles such as acrylonitrile and methacrylonitrile; N-alkyl (meth)acrylamide such as N-isopropyl acrylamide, N-isopropyl methacrylamide, N-t-butyl acrylamide, N-t-octyl acrylamide, N,N-dimethyl aminoethyl methacrylate, N,N-diethyl aminoethyl methacrylate; monomers such as vinyl chloride, vinyl acetate, vinyl propionate, and vinyl pyrrolidone, and monomers containing one or more urea or urethane groups, such as for instance the reaction product of 1 mole of isocyanato-ethyl methacrylate and 1 mole of butylamine, 1 mole of benzylamine, 1 mole of butanol, 1 mole of 2-ethylhexanol, and 1 mole of methanol, respectively. Mixtures of these compounds may also be used.

Preferably, in a second step of the preparation of the polymer dispersion (I), a monomer mixture B is used, consisting of
- (e) 5–8 mole % (meth)acrylic acid,
- (f) 5–12 mole % hydroxy alkyl (meth)acrylate,
- (g) 0–30 mole % styrene, and
- (h) 50–90 mole % of a different copolymerizable monoethylenically unsaturated monomer.

Examples of hydroxy alkyl (meth)acrylates have been mentioned above. 2-hydroxyethyl methacrylate is preferred.

Examples of copolymerizable monoethylenically unsaturated monomers which may be used in the monomer mixture B include the examples mentioned above for copolymerizable monoethylenically unsaturated monomers which may be used in the monomer mixture A. Also included are (cyclo)alkyl (meth)acrylates having a (cyclo) alkyl group with 4–12 carbon atoms. Examples thereof are also mentioned above. Mixtures of these compounds may also be used. Preferably, the copolymerizable monoethylenically unsaturated monomers are selected from methyl methacrylate, butyl acrylate, butyl methacrylate, and mixtures thereof.

Preferably, polymer dispersion (I) is prepared by emulsion polymerization of
- (1) 70–90, preferably 75–85, parts by weight of monomer mixture A and
- (2) 10–30, preferably 15–25, parts by weight of monomer mixture B.

Optionally, different monomer mixtures A and/or B may be used successively.

Since the addition polymer (I) is non-crosslinked, the choice of the monomers in monomer mixtures A and B is such that the functional groups present other than the unsaturated bonds cannot react with each other at the reaction conditions for the preparation of the addition polymer.

It is required that the total amount of (meth)acrylic acid in 100 parts of the total addition polymer (I) is less than 1.75 wt. %, preferably less than 1.5 wt. %, more preferably between 0.5–1.4 wt. %. In this manner, the polymer dispersion (I) is non-swellable. The acid value is 3 to 10 mg KOH/g, preferably 5 to 8 mg KOH/g.

The addition polymer (I) has a Mn of from 50 000 to 2 000 000, preferably from 100 000 to 1 000 000.

Preferably, monomer mixture C used in the preparation of the polymer dispersion (II) consists of
- (j) 50–70 wt. % (cyclo)alkyl (meth)acrylate,
- (k) 30–40 wt. % (meth)acrylic acid,
- (m) 0–5 wt. % hydroxyalkyl (meth)acrylate, and
- (n) 0–5 wt. % of a different copolymerizable monoethylenically unsaturated monomer.

Preferably, the polymer dispersion (II) is prepared by emulsion polymerization of
- (iii) 99.85–99.95 parts by weight of monomer mixture C and
- (iv) 0.05–0.15 parts by weight of a compound having at least two unsaturated groups.

Preferably, the (cyclo)alkyl (meth)acrylates in monomer mixture C have alkyl groups with 1–4 carbon atoms. Examples include methyl methacrylate, methyl acrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, t-butyl acrylate, t-butyl methacrylate, and mixtures thereof. Preferred are methyl acrylate, ethyl acrylate, and propyl acrylate.

Examples of hydroxyalkyl (meth)acrylates and copolymerizable monoethylenically unsaturated monomer to be used in monomer mixture C are given above for monomer mixtures A and B.

Examples of the compound having at least two unsaturated groups include divinyl toluene, divinyl benzene, trivinyl benzene, divinyl naphthalene, ethylene glycol di(meth)acrylate, trimethylene glycol di(meth)acrylate, 2-ethyl hexane-1,3-dimethacrylate, divinyl xylene, divinyl ethyl benzene, divinyl ether, divinyl sulfone, allyl ethers of polyhydric compounds, such as glycerol, pentaerythritol, sorbitol, sucrose, and resorcinol, allyl ethers of polyisocyanate compounds, such as triallyl isocyanurate, divinyl ketone, divinyl sulfide, allyl (meth)acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl citrate, triallyl phosphate, and N,N'-methylene di(meth)acrylamide. Preferred is a compound having at least two unsaturated groups of which at least one is an allylic group. More preferred are diallyl phthalate, allyl methacrylate, and triallyl isocyanurate.

The addition polymer (II) has an acid value of 175 to 350 mg KOH/g, preferably 200 to 300 mg KOH/g, and a hydroxyl value of 0 to 150 mg KOH/g, preferably 0 to 100 mg KOH/g.

By emulsion polymerization is meant here the polymerization of the monomer mixtures of ethylenically unsaturated monomers in water in the presence of a water-soluble or -insoluble initiator and 0.1–5 wt. %, preferably 0.3–2.5 wt. % (calculated on the total monomer mixture(s)) of an emulsifier. The polymer dispersion (I) may be prepared by emulsion polymerization as disclosed in EP-A-0 287 144. The polymer dispersion (II) may be prepared by emulsion polymerization as disclosed in GB 870 994.

The emulsifiers of which use is preferably made in the emulsion polymerization are of an anionic and/or non-ionic nature. Examples of anionic emulsifiers include: potassium laurate, potassium stearate, potassium oleate, sodium decyl sulphate, sodium dodecyl sulphate, sodium dodecylbenzene sulphonic acid, and sodium rosinate. Examples of non-ionic emulsifiers include: linear and branched alkyl and alkylaryl polyethylene glycol and polypropylene glycol ethers and thioethers, alkyl phenoxypoly(ethyleneoxy) ethanols such as the adduct of 1 mole of nonyl phenol and 3–12 moles of ethylene oxide; alkyl (ethyleneoxy) ethanols with 8–18 carbon atoms in the alkyl groups, such as the adduct of 1 mole dodecanol and 3–12 moles of ethylene oxide. Examples of emulsifiers comprising anionic and non-ionic groups are the ammonium or sodium salt of the sulphate of alkyl phenoxypoly(ethyleneoxy) ethanols, such as the adduct of 1 mole of nonyl phenol and 3–12 moles of ethylene oxide, and the ammonium or sodium salt of the sulphate of alkyl (ethyleneoxy) ethanols with 8–18 carbon atoms in the alkyl groups, such as the adduct of 1 mole $C_{12-14}$ alcohol and 3–12 moles of ethylene oxide. Preferred is the ammonium or sodium sulphate salt of the adduct of 1 mole $C_{12-14}$ alcohol and 3–12 moles of ethylene oxide.

Also, in emulsion polymerization, the conventional radical initiators may be used in the usual amounts. Examples of suitable radical initiators include water-soluble initiators, such as ammonium persulphate, sodium persulphate, potassium persulphate, and t-butyl hydroperoxide, and water-insoluble initiators, such as bis(2-ethylhexyl) peroxydicarbonate, di-n-butyl peroxydicarbonate, t-butyl perpivalate, cumene hydroperoxide, dibenzoyl peroxide, dilauroyl peroxide, 2,2'-azobisisobutyronitrile, and 2,2'-azobis-2-methylbutyronitrile. As suitable reducing agents which may be used in combination with e.g. a hydroperoxide may be mentioned: ascorbic acid, sodium sulphoxylate formaldehyde, thiosulphates, bisulphates hydrosulphates, water-soluble amines such as diethylene triamine, triethylene tetramine, tetraethylene pentamine, N,N'-dimethyl ethanol amine, and N,N-diethyl ethanol amine, and reducing salts such as cobalt, iron, nickel, and copper sulphate. Optionally, a chain length regulator, for instance n-octyl mercaptan, dodecyl mercaptan, and 3-mercaptopropionic acid, may also be used.

Copolymerization of the monomer mixtures generally is carried out at atmospheric pressure at a temperature of 40–100° C., preferably 60–90° C., in an atmosphere of an inert gas, such as nitrogen. Optionally, however, copolymerization may also be carried out at elevated pressure. The reaction conditions for monomer mixtures A and B should however be chosen in such manner that functional groups present in the monomer mixtures other than the unsaturated bonds cannot react with each other.

According to the invention the carboxylic acid groups derived from the acrylic acid and/or methacrylic acid are at least 40–100% neutralized by the addition of a neutralizing agent. As suitable neutralizing agents for the carboxylic acid may be mentioned ammonia and amines such as N,N-dimethyl ethanol amine, N,N-diethyl ethanol amine, 2-(dimethyl)-amino-2-methyl-1-propanol, triethyl amine, and morpholine. It is preferred that the neutralizing of the carboxylic acid groups should be carried out after the polymerization.

The coating composition according to the invention comprises preferably a mixture of 92–95 wt. % of a filmforming binder composition comprising an alkali non-swellable core-shell addition polymer dispersion (I), and 5–7.5 wt. % of a rheology modifying addition polymer dispersion (II).

The coating composition of the present invention consists essentially of water, being an aqueous coating composition. However, about 20 wt. % of liquid content of the coating composition may be an organic solvent. As suitable organic solvents may be mentioned such ether group-containing alcohols as hexylglycol, butoxyethanol, 1-methoxy-propanol-2, 1-ethoxy-propanol-2, 1-propoxy-propanol-2, 1-butoxy-propanol-2, and 1-isobutoxy-propanol-2; alcohols, such as methanol, ethanol, propanol, butanol, pentanol, and hexanol; diols, such as ethylene glycol and diethylene glycol.

The coating composition according to the present invention may be cured by physical drying. Alternatively, however, the coating compositions may be cured in the presence of a curing agent which reacts with hydroxyl and/or carboxyl groups.

Examples of suitable curing agents include N-methylol and/or N-methylol ether groups-containing aminoplastes obtained by reacting an aldehyde, for instance formaldehyde, with an amino or amido groups-containing compound such as melamine, such as Cymel 328, ex Cytec, urea, N,N'-ethylene urea, dicyanodiamide, and benzoguanamine. The resulting compounds are preferably wholly or partially etherified with alcohols having 1–6 carbon atoms, such as methanol, ethanol, n-propanol, isopropanol, n-butanol, isobutanol, amyl alcohol, hexanol, or mixtures thereof. Especially favourable results may be obtained when using a methylol melamine having 4–6 methyl groups per molecule of melamine, at least 3 methylol groups being etherified with butanol or a butanol etherified condensation product of formaldehyde and N,N'-ethylene diurea. Examples of other suitable curing agents include polyisocyanates or water-dispersible blocked polyisocyanate such as a methyl ethyl ketoxime-blocked, isocyanate group-containing adduct of a polyisocyanate to a hydroxycarboxylic acid, e.g. dimethylol propionic acid, and aliphatic or aromatic carbodiimides.

In addition to the alkali non-swellable core-shell addition polymer dispersion (I), the filmforming binder composition may also comprise water-dilutable materials such as alkyd resins, polyesters, polyurethanes, and mixtures thereof.

Preferably, the water dilutable material is a polyurethane. The filmforming binder composition may comprise 0.1 to 100 wt. % of the alkali non-swellable core-shell addition polymer dispersion (I) and 99.9 to 0 wt. % of at least one water dilutable material, wherein the sum of the wt. % indicated for dispersion (I) and the water dilutable material (s) is always 100 wt. %. More preferably, the filmforming binder composition may comprise 1 to 99 wt. % of the alkali non-swellable core-shell addition polymer dispersion (I) and 99 to 1 wt. % of at least one water dilutable material. Most preferably, the filmforming binder composition may comprise 25 to 75 wt. % of the alkali non-swellable core-shell addition polymer dispersion (I) and 75 to 25 wt. % of at least one water dilutable material.

In addition, the coating composition may contain the conventional additives and adjuvants, such as pigments, dispersing agents, dyes, and accelerators for the curing reaction. The applicable pigments may have an acid, a neutral or a basic character. Optionally, the pigments may be pre-treated to modify the properties. Examples of suitable pigments include metallic pigments such as aluminum and stainless steel; nacreous pigments, such as mica coated with a metal oxide such as iron oxide and/or titanium dioxide; inorganic pigments, such as titanium dioxide, iron oxide, carbon black, silica, kaolin, talc, barium sulphate, lead silicate, strontium chromate, and chromium oxide; and organic pigments, such as phthalocyanine pigments.

The solids content of the coating composition ranges from 5–60 wt. %, preferably from 10–40 wt. %. This depends on whether a metallic pigment is used or not. The presence of metallic pigments results in a lower solid content compared to the presence of non-metallic pigments. However, compared to conventional aqueous base coat systems, the solid content of the coating composition of the present invention is in both cases higher.

Preferably, the coating composition according to the present invention is used as a base coat in a so-called base coat/clear coat system to provide a high gloss metallic appearance. To this end the coating composition according to the invention comprises so-called "non-leafing" aluminum paste or some other metallic pigment. Use of the coating compositions according to the invention as a base coat may prevent the base coat from being softened by the clear coat after being sprayed with it, so that the metallic effect will not be lost.

The clear coat used in the base coat/clear coat system may for instance be a clear baking lacquer of a conventional polyacrylate/melamine composition. The clear coat may also be a two-component polyester or polyacrylate/polyisocyanate composition. The polyisocyanate may be for example the trimer of 1,6-hexamethylene diisocyanate.

The coating composition according to the invention may be applied to a substrate in any desirable manner, such as by roller coating, spraying, brushing, sprinkling, flow coating, dipping, electrostatic spraying, or electrophoresis, preferably by spraying.

Suitable substrates may be made of wood, metal, and synthetic material. Curing may be carried out at ambient temperature or, optionally, at elevated temperature to reduce the curing time. Optionally, the coating composition may be baked at higher temperatures in the range of, for instance, 60 to 160° C., in a baking oven over a period of 10 to 60 minutes. The clear coat may be applied wet-on-wet on the base coat. Optionally, the base coat may be partially cured prior to the application of the clear coat. Also, the base coat may be fully cured prior to the application of the clear coat.

The compositions are particularly suitable in the preparation of coated metal substrates, such as in the refinish industry, in particular the body shop, to repair automobiles and transportation vehicles and in finishing large transportation vehicles such as trains, trucks, buses, and aeroplanes. The compositions of the present invention may also be used in the first finishing of automobiles.

The invention will be further described in the following examples, which must not be construed as limiting the scope of the present invention.

EXAMPLES

Test methods used in the examples are described below.

The mean particle size of the dispersions was determined by dynamic light scattering, the dispersion being diluted with water to a solids content of about 0.1 wt. %.

The viscosity was determined with a Brookfield viscometer.

The solids content is determined in accordance with ASTM method D 1644-59 with heating at 130° C. over a period of 30 minutes.

The metallic-flake orientation can be measured by a spectrogoniometer. The intensity of the reflected light at angle $\beta$ is measured for a given incident angle $\alpha$. The so-called flop can be obtained by measurement of the intensity of the reflection (L-value) at two different angles.

$$\text{Flop} = \Delta L = L(\beta_1) - L(\beta_2)$$

wherein $L(\beta_1)$=intensity of the reflected light at an angle of $\pm 110°$ $L(\beta_2)$=intensity of the reflected light at an angle of $\pm 25°$ A silver-shaded low solids metallic base coat /clear coat system exhibits a flop-value of approximately 55 to 75 depending on the metallic grade, when measured in this way.

The humidity resistance can be judged visually by the presence of blisters after the test.

The following compounds were used.

Trigonox A–W70®, 70 wt. % t-butyl hydroperoxide in water, ex Akzo Nobel Chemicals Abex JKB®, ammonium sulphate of an ethoxylated alkyl alcohol, solids content of 29.3 wt. %, ex Rhôone-Poulenc Perlankrol EP36®, sodium sulphate of the adduct of 1 mole dodecanol and 6 moles ethylene oxide, solid content of 29.2 wt. %, ex Ackros Rhodapex AB/20®, ammonium sulphate of the adduct of 1 mole $C_{12-14}$-alcohol and 9 moles ethylene oxide, solids content of 28.7 wt. %, ex Rhône-Poulenc Setal EPC 4673, polyesterpolyol, ex. Akzo Nobel Resins Cymel 328®, melamine crosslinker, ex Cytec Preparation of Alkali Non-Swellable Core-Shell Addition Polymer Dispersions (I)

Example 1

A: Preparation of Copolymer A of Monomer Mixture A in Step I

A 2 l flask fitted with a stirrer, a thermometer, a reflux condenser and dropping funnels A and B was filled with:

435.0 g of demineralized water and 12.0 g of emulsifier Perlankrol EP36®.

Dropping funnel A was filled with:

280.0 g of monomer mixture I (see Table I).

Dropping funnel B was filled with a homogeneous mixture of:

140.0 g of demineralized water and 1.4 g of sodium persulphate.

After deaeration, the contents of both the flask and the dropping funnels were brought under a nitrogen atmosphere, and the contents of the flask were heated to 80° C. Next, the contents of dropping funnel B were introduced into the flask over a period of 3 minutes.

After the contents of the flask were brought again to 80° C., the contents of dropping funnel A were introduced into the flask at a constant rate over a period of 2.5 hours, after which the contents of the flask were kept at 80° C. for another 1.5 hours.

B: Preparation of Polymer Dispersion (I) in Step 2

Dropping funnel A was filled with 70.0 g of monomer mixture II (see Table I)

and dropping funnel B was filled with a homogeneous mixture of:

35.0 g of demineralized water and 0.35 g of sodium persulphate.

The contents of dropping funnel B were introduced into the flask, comprising copolymer A, over a period of 3 minutes. The contents of the flask were brought again to 80° C. and the contents of dropping funnel A were introduced into the flask at a constant rate over a period of 1 hour, after which the contents of the flask were kept at 80° C. for another 2 hours. The reaction was carried out under a nitrogen atmosphere.

On conclusion of the reaction the contents of the flask were cooled to 70° C., after which there were added dropwise 41.3 g of a 10 wt. % solution of N,N-dimethyl ethanol amine in water. Subsequently, the contents of the flask were cooled to ambient temperature and filtered over a 30 μm filter cloth. The properties of the dispersion are given in Table II.

Example 2

Example 1 was repeated except for the following:

A: Preparation of Copolymer A of Monomer Mixture A in Step 1

Dropping funnel A was filled with 280.0 g of monomer mixture III (see Table I) instead of monomer mixture I.

B: Preparation of Polymer Dispersion (I) in Step 2

Dropping funnel A was filled with 70.0 g of monomer mixture IV (see Table I) instead of II.

After conclusion of the reaction were added 43.5 g of a 10 wt. % solution of N,N-dimethyl ethanol amine in water. The properties of the resulting dispersion are given in Table II.

Example 3

A: Preparation of Copolymer A of Monomer Mixture A in Step 1

A 2 l flask fitted with a stirrer, a thermometer, a reflux condenser, and dropping funnels A and B was filled with:

339.0 g of demineralized water, and 8.0 g of emulsifier Rhodapex AB/20®.

Dropping funnel A was filled with:

378.7 g of a monomer pre-emulsion composed of 93.3 g of demineralized water, 5.4 g of Rhodapex AB/20®, and 280.0 g of monomer mixture III (see Table I).

Dropping funnel B was filled with a homogeneous mixture of:

140.0 g of demineralized water and 1.4 g of ammonium persulphate.

After deaeration, the contents of both the flask and the dropping funnels were brought under a nitrogen atmosphere, and the contents of the flask were heated to 50° C., after which 5% of the contents of dropping funnel A were introduced into the flask over a period of 2 minutes.

Next, the contents of the flask were heated to 80° C. and 30% of the contents of dropping funnel B were added to the contents of the flask. The contents of the flask were kept at 80° C. for 15 minutes, and subsequently the rest of the contents of the dropping funnels A and B were introduced into the flask at a constant rate over a period of 2.5 hours, after which the contents of the flask were kept at 80° C. for another hour.

B: Preparation of Polymer Dispersion (I) in Step 2

Dropping funnel A was filled with:

70.0 g of monomer mixture IV (see table 1)

and dropping funnel B was filled with a homogeneous mixture of:

35.0 g of demineralized water and 0.35 g of ammonium persulphate.

The contents of both dropping funnels were introduced into the flask comprising copolymer A at a constant rate over a period of 1 hour, after which the contents of the flask were kept at 80° C. for another hour.

On conclusion of the reaction the contents of the flask were cooled to 70° C., after which there were added dropwise 43.5 g of a 10 wt. % solution of N,N-dimethyl ethanol amine in water. Subsequently, the contents of the flask were cooled to ambient temperature and filtered over a 30 μm filter cloth. The properties of the dispersion are given in Table II.

Example 4

Example 3 was repeated except for the following:

A: Preparation of Copolymer A of Monomer Mixture A in Step 1

The flask was filled with 338.0 g of demineralized water and 13.4 g of emulsifier Rhodapex AB/20®.

B: Preparation of Polymer Dispersion (I) in Step 2

Dropping funnel A was filled with:

70.0 g of monomer mixture V (see Table I)

The properties of the dispersion are given in Table II.

Example 5

Example 4 was repeated, except for the following:

A: Preparation of Copolymer A of Monomer Mixture A in Step 1

The monomer pre-emulsion was composed of 280.0 g of monomer mixture VI (see Table I) instead of monomer mixture III.

The properties of the dispersion are given in Table II.

Example 6

Example 4 was repeated, except for the following:

B: Preparation of Polymer Dispersion (I) in Step 2

Dropping funnel A was filled with 70.0 g of monomer mixture VII (see Table I) instead of monomer mixture V.

The properties of the dispersion are given in Table II.

Example 7

A: Preparation of Copolymer A of Monomer Mixture A in Step 1

A 3 l flask fitted with a stirrer, a thermometer, a reflux condenser, and dropping funnels A and B was filled with:
621.1 g of demineralized water, and
5.4 g of a 20 wt. % solution of sodium dodecylbenzene sulphonic acid solution in demineralized water Dropping funnel A was filled with:
683.8 g of a pre-emulsion composed of
   507.1 g of monomer mixture VIII (see Table I)
   10.0 g of a 20 wt. % solution of sodium dodecylbenzene sulphonic acid in demineralized water
   166.7 g of demineralized water Dropping funnel B was filled with 55.3 g of a homogeneous mixture of
   53.3 g of demineralized water
   2.02 g of sodium persulphate After deaeration, the contents of both the flask and the dropping funnels were brought under a nitrogen atmosphere, and the contents of the flask were heated to 50° C. After 9.6 g of the contents of dropping funnel A were introduced into the flask in a period of 1 minute, the contents of the flask were heated to 83° C. Subsequently, 25% of the contents of dropping funnel B were introduced into the flask after which the contents of the flask were kept at 83° C. for a period of 15 minutes. Subsequently, the rest of the contents of dropping funnel A and B were introduced into the flask at a constant rate over a period of 3 hours, after which the contents of the flask were kept at 83° C. for another 30 minutes and subsequently diluted with 143.3 g of demineralized water.

B: Preparation of Polymer Dispersion (I) in Step 2
Dropping funnel A was filled with
   126.7 g of monomer mixture IX (see Table I)
and dropping funnel B was filled with a homogeneous mixture of
   33.3 g of demineralized water and
   0.51 g of sodium persulphate.

The contents of both dropping funnels were introduced into the flask comprising copolymer A at a constant rate over a period of 1 hour, after which the contents of the flask were kept at 80° C. for another hour.

On conclusion of the reaction the contents of the flask were cooled to ambient temperature and filtered over a 80 μm filter cloth, after which there were added dropwise 13.5 g of a 30 wt. % solution of N,N-dimethyl ethanol amine in demineralized water. The properties of the dispersion are given in Table II.

Example 8

Example 7 was repeated except for the following:
A: Preparation of Copolymer A of Monomer Mixture A in Step 1
   The monomer pre-emulsion was composed of:
   507.1 g of monomer mixture X instead of monomer mixture VIII.
   For dropping funnel B ammonium persulphate was used instead of sodium persulphate.
B: Preparation of Polymer Dispersion (I) in Step 2
   The monomer mixture was composed of:
   126.7 g of monomer mixture XI instead of monomer mixture IX.

On conclusion of the reaction the dispersion was neutralized with 11.7 g of a 30 wt. % solution of N,N-dimethyl ethanol amine in demineralized water instead of 13.5 g of this solution. The properties of the dispersion are given in Table II.

Example 9

Example 8 was repeated except for the following
A: Preparation of Copolymer A of Monomer Mixture A in Step 1
   The flask was filled with
   626.0 g demineralized water and
   3.7 g of emulsifier Perlankrol EP36®.
   Dropping funnel A was filled with:
   680.7 g of a pre-emulsion composed of
      507.1 g of monomer mixture X (see Table I),
      6.85 g of emulsifier Perlankrol EP36®, and
      166.7 g of demineralized water.
B: Preparation of Polymer Dispersion (I) in Step 2
   On conclusion of the reaction the dispersion was neutralized with 12.8 g of a 30 wt. % solution of N,N-dimethyl ethanol amine in demineralized water instead of 11.7 g of this solution. The properties of the dispersion are given in Table II.

The Preparation of Rheology Modifying Addition Polymer Dispersions (II)

Example 10

A 2 l flask fitted with a stirrer, a thermometer, a reflux condenser, and dropping funnels was filled with:
   460.0 g of demineralized water and
   2.64 g of Abex JKB®.

Dropping funnel A was filled with:
   422.0 g of a monomer pre-emulsion composed of:
      150.0 g of demineralized water,
      12.0 g of Abex JKB®, and
      260.0 g of monomer mixture XII (see Table I).

Dropping funnel B was filled with a homogeneous mixture of
   25.0 g of demineralized water and
   0.38 g of ammonium persulphate.

Dropping funnel C was filled with a homogeneous mixture of
   30.0 g of demineralized water and
   0.14 g of ammonium persulphate After deaeration, the contents of both the flask and the dropping funnels were brought under a nitrogen atmosphere and the contents of the flask were heated to 85° C., after which 20 g of the contents of dropping funnel A and the contents of dropping funnel B were introduced into the flask. The contents of the flask were kept at 85° C. for 15 minutes.

Subsequently the rest of the contents of dropping funnel A and the contents of dropping funnel C were introduced into the flask at a constant rate over a period of 90 minutes. Dropping funnel A was rinsed then with 60 g of demineralized water and after this has been introduced into the flask, the contents of the flask were kept at 85° C. for another 30 minutes.

In the meantime dropping funnel D was filled with a homogeneous mixture of:
   30.0 g of demineralized water and
   0.60 g Trigonox A-W70®
and dropping funnel E was filled with a homogeneous mixture of:

30.0 g of demineralized water and 0.25 g of sodium formaldehyde sulphoxylate.

After the contents of the flask were cooled to 63° C., the contents of dropping funnel D were introduced into the flask and after 10 minutes the contents of dropping funnel E were introduced into the flask at a constant rate over a period of 30 minutes. Subsequently, the contents of the flask were cooled to ambient temperature and filtered over a 30 μm filter cloth. The properties of the dispersion are given in Table III.

Example 11

Example 10 was repeated except for the following:

Dropping funnel A was filled with 260.0 g of monomer mixture XIII (see Table I) instead of monomer mixture XII.

The properties of the dispersion are given in Table III.

Example 12

Example 10 was repeated except for the following:

Dropping funnel A was filled with 260.0 g of monomer mixture XIV (see Table I) instead of monomer mixture XII.

The properties of the dispersion are given in Table III.

Example 13

Example 10 was repeated except for the following:

The flask was now filled with 279.7 g of demineralized water and 1.0 g of Abex JKB®.

The properties of the dispersion are given in Table III.

Base Coat Compositions

Examples 14–19 and Comparative Examples A and B

Base coat compositions were prepared as follows.

A mixture of 22 g of aluminum paste (65% solids in aliphatic/aromatic hydrocarbons, Aquavex Sparkle Silver E5000AR, ex Silberline) and 28 g butoxyethanol was added with stirring to a mixture of 190 g of a polymer dispersion (I) according to Examples 1–6 and 14 g of a polymer dispersion (II) according to Examples 10–12.

The base coat compositions were brought to a pH of 7.5–8.0 by the addition of N,N-dimethyl ethanol amine and diluted with water to spraying viscosity (efflux time of 35 sec. in DIN-cup No. 4). The solids contents of all the base coat compositions were in the range of 14–16 wt. %.

In an atmosphere having a relative humidity of 65% the base coat compositions of the present invention were sprayed onto primer coated steel test panels in a film thickness of 10–25 μm (in the dry state). Additionally, two test panels were prepared with a conventional low solids solvent borne base coat based on an acrylic/melamine system (comparative example A) and the aqueous core/shell dispersion of Example 5 of EP-A-0 287 144 (comparative example B).

After drying to mat at ambient temperature, the panels were tack free. Next, these test panels were partially covered up and the remaining part was repainted by spraying with a conventional clear coat, a two-component polyester/polyisocyanate coating composition, with the polyisocyanate being a trimer of 1,6-hexamethylene diisocyanate (in a film thickness of 50–60 μm in a dry state).

After curing for one day at ambient temperature, the test panels 14–19 showed a metallic coat of high gloss. After one week at ambient temperature, the solvent- and water-resistance of the test panels 14–19 were excellent, comparable with test panels A and B.

The flop of both the base coat and the base coat provided with clear coat was measured (see Table IV). The flop values of the base coats based on the coating compositions according to the invention are excellent, comparable with test panels A and B. The decrease of flop by the application of the clear coat (strike-in) is practically zero, so that the excellent flop is maintained. However, the flop values of the base coat/clear coat of test panels A and B are significantly lower showing a considerable strike-in effect.

Examples 20–22 and Comparative Example C

Base coat compositions were prepared as follows.

A mixture of 20 g of aluminum paste (65 wt. %, Aquavex Sparkle Silver E5000AR from Silberline), 25.6 g of butoxyethanol, 30.2 g of Setal EPC 4673, 23.5 g of Cymel 328®, 97.8 g of water, and 7.2 g of a 30 wt. % solution of N,N-dimethyl ethanol amine in water was added with stirring to a mixture of 133.3 g of a polymer dispersion (I) according to Examples 7–9

90.7 g of water, and 13.3 g of a polymer dispersion (II) according to Example 13.

The base coat compositions were brought to a pH of 7.5–8.0 by addition of N,N-dimethyl ethanol amine and diluted with water to spraying viscosity (efflux time of 28 sec in DIN-cup No. 4). Solid content was 20 wt. %.

The base coat compositions were sprayed onto steel test panels in a film thickness of 12–18 μm (in the dry state). After a flash-off period of 2 minutes at 23° C. and 8 minutes at 80° C., the test panels were repainted with a conventional clearcoat, in a film thickness of 40–45 μm in the dry state.

The clearcoat was a so-called one component polyacrylate/aminoplaste coating composition. The aminoplaste is a polymeric melamine type resin. After curing for 24 minutes at 140° C., a metallic coat of good appearance was obtained.

The test panels were tested for their humidity resistance in comparison with a reference waterborne base coat (Example 5 of EP-A-0 287 144; Comparative Example C). The humidity resistance of the test panels 20 to 22 is excellent in comparison to the humidity resistance of test panel C. Table V gives the results of the test.

TABLE I

Monomer compositions

| | wt. % | | mole % |
|---|---|---|---|
| I | 30 | styrene | 36.05 |
| | 45 | butyl methacrylate | 39.61 |
| | 20 | butyl acrylate | 19.53 |
| | 5 | 2-hydroxyethyl methacrylate | 4.81 |

TABLE I-continued

Monomer compositions

| | wt. % | | mole % |
|---|---|---|---|
| II | 40 | methyl methacrylate | 45.55 |
| | 6 | methacrylic acid | 7.95 |
| | 10 | 2-hydroxyethyl methacrylate | 8.76 |
| | 16 | butyl methacrylate | 12.83 |
| | 28 | butyl acrylate | 24.91 |
| III | 40 | styrene | 47.10 |
| | 47 | butyl methacrylate | 40.53 |
| | 8 | butyl acrylate | 7.66 |
| | 5 | 2-hydroxyethyl methacrylate | 4.71 |
| IV | 40 | methyl methacrylate | 44.92 |
| | 6 | methacrylic acid | 7.84 |
| | 44 | butyl acrylate | 38.60 |
| | 10 | 2-hydroxyethyl methacrylate | 8.64 |
| V | 30 | methyl methacrylate | 34.54 |
| | 6 | methacrylic acid | 8.03 |
| | 54 | butyl acrylate | 48.57 |
| | 10 | 2-hydroxyethyl methacrylate | 8.86 |
| VI | 40 | styrene | 46.57 |
| | 35 | butyl methacrylate | 29.85 |
| | 20 | butyl acrylate | 18.92 |
| | 5 | 2-hydroxyethyl methacrylate | 4.66 |
| VII | 20 | methyl methacrylate | 23.62 |
| | 64 | butyl acrylate | 59.05 |
| | 6 | methacrylic acid | 8.24 |
| | 10 | 2-hydroxyethyl methacrylate | 9.09 |
| VIII | 20 | butyl acrylate | 21.54 |
| | 70 | butyl methacrylate | 67.86 |
| | 10 | 2-hydroxyethyl methacrylate | 10.60 |
| IX | 39 | methyl methacrylate | 43.91 |
| | 45 | butyl acrylate | 39.58 |
| | 10 | 2-hydroxyethyl methacrylate | 8.66 |
| | 6 | methacrylic acid | 7.85 |
| X | 20 | butyl acrylate | 20.11 |
| | 50.5 | butyl methacrylate | 45.72 |
| | 20 | styrene | 24.76 |
| | 9.5 | 2-hydroxyethyl methacrylate | 9.41 |
| XI | 41 | methyl methacrylate | 46.68 |
| | 35.45 | butyl acrylate | 31.53 |
| | 10.00 | butyl methacrylate | 8.01 |
| | 9.25 | 2-hydroxyethyl methacrylate | 8.10 |
| | 4.30 | methacrylic acid | 5.69 |
| XII | 64.00 | ethyl acrylate | 60.53 |
| | 35.85 | methacrylic acid | 39.41 |
| | 0.15 | diallyl phthalate | 0.058 |
| XIII | 64.10 | ethyl acrylate | 60.58 |
| | 35.85 | methacrylic acid | 39.38 |
| | 0.05 | allyl methacrylate | 0.037 |
| XIV | 64.10 | ethyl acrylate | 60.59 |
| | 35.85 | methacrylic acid | 39.39 |
| | 0.05 | triallyl isocyanurate | 0.019 |

TABLE II

Properties of addition polymer dispersions

| Ex. | Monomer comp. | Solids contents (wt. %) | Viscosity (in Pa · s) | pH | Mean particle size (nm) | OH value | COOH value |
|---|---|---|---|---|---|---|---|
| 1 | I/II | 35.2 | 20 | 8.1 | 83 | 25.9 | 7.8 |
| 2 | III/IV | 35.2 | 25 | 8.1 | 83 | 25.9 | 7.8 |
| 3 | III/IV | 35.2 | 36 | 8.2 | 93 | 25.9 | 7.8 |
| 4 | III/V | 34.5 | 23 | 8.4 | 90 | 25.9 | 7.8 |
| 5 | VI/IV | 35.3 | 20 | 8.3 | 91 | 25.9 | 7.8 |
| 6 | III/VII | 35.3 | 22 | 8.5 | 91 | 25.9 | 7.8 |
| 7 | VIII/IX | 38.3 | 18 | 8.0 | 128 | 43 | 7.8 |
| 8 | X/XI | 38.5 | 24 | 8.1 | 92 | 40 | 5.6 |
| 9 | X/XI | 38.2 | 23 | 8.0 | 89 | 41 | 7.8 |

TABLE III

Properties of the rheology modifier dispersions

| Ex. | Monomer comp. | Solids contents (wt. %) | Viscosity (in Pa · s) | pH | Mean particle size (nm) |
|---|---|---|---|---|---|
| 10 | XII | 25 | 8 | 3.0 | 70 |
| 11 | XIII | 25 | 8 | 2.8 | 70 |
| 12 | XIV | 25 | 8 | 2.6 | 71 |
| 13 | XII | 30 | 10 | 2.7 | 121 |

TABLE IV

Flop values

| Base coat according to Example | Polymer dispersions according to Examples | Flop of base coat | Flop of base coat/ clear coat | Strike-in |
|---|---|---|---|---|
| A | — | 64 | 60 | 4 |
| B | — | 66 | 62 | 4 |
| 14 | 1/10 | 64 | 63 | 1 |
| 15 | 2/10 | 66 | 66 | 0 |
| 16 | 3/11 | 66 | 66 | 0 |
| 17 | 4/11 | 65 | 65 | 0 |
| 18 | 5/12 | 64 | 63 | 1 |
| 19 | 6/12 | 65 | 64 | 1 |

TABLE V

Humidity resistance results

| Base coat according to Example | Polymer dispersions according to Examples | Presence of blisters after the test |
|---|---|---|
| C | — | yes (medium/fine) |
| 20 | 7/13 | no |
| 21 | 8/13 | no |
| 22 | 9/13 | no |

We claim:

1. Aqueous coating composition comprising a mixture of
  90 to 99 wt. % of a filmforming binder composition comprising an alkali non-swellable core-shell addition polymer dispersion (I), and
  1–10 wt. % of a rheology modifying addition polymer dispersion (II),
  the sum of the wt. % indicated for the filmforming binder composition and dispersion (II) always being 100 wt. %,
  wherein
  the polymer dispersion (I) is prepared in two or more steps by emulsion polymerization, and obtained by copolymerization in a first step of
  (1) 60–95 parts by weight (calculated on 100 parts by weight of the total addition polymer (I)) of a monomer mixture A consisting of
    (i) 65–100 mole % of a mixture of
      (a) 10–98 mole % of a (cyclo)alkyl (meth)acrylate of which the (cyclo)alkyl group contains 4–12 carbon atoms,
      (b) 0–55 mole % styrene,
      (c) 2–15 mole % hydroxy alkyl (meth)acrylate, and
      (d) 0–20 mole % of a di(cyclo)alkyl maleate and/or fumarate of which the (cyclo)alkyl groups contain 4–12 carbon atoms, the sum of the mole % indicated for monomers (a), (b), (c), and (d) always being 100 mole %, and (ii) 0–35 mole % of a copolymerizable monoethylenically unsaturated monomer other than (a), (b), (c) or (d), the sum of the mole % indicated for components (i) and (ii) always being 100 mole %, and by copolymerization in a subsequent step of (2) 5–40 parts by weight (calculated on 100 parts by weight of the total addition polymer (I)) of a monomer mixture B consisting of (e) 1–10 mole % (meth)acrylic acid, (f) 2–20 mole % hydroxy alkyl (meth)acrylate, (g) 0–55 mole % styrene, and (h) 15–97 mole % of a copolymerizable monoethylenically unsaturated monomer other than (e), (f), or (g).

the sum of the mole % indicated for monomers (e), (f), (g), and (h) always being 100 mole %, with the carboxylic acid groups derived from the (meth) acrylic acid being at least partially neutralized, resulting in a non-crosslinked addition polymer I, whereby the total amount of (meth)acrylic acid in 100 parts of the total addition polymer (I) is less than 1.75 wt. %, and wherein the polymer dispersion (II) is prepared by emulsion polymerization, and obtained by copolymerization of (iii) 99.5–99.99 parts by weight (calculated on 100 parts by weight of the total addition polymer (II)) of a monomer mixture C consisting of (j) 10–80 wt. % (cyclo)alkyl (meth)acrylate, (k) 20–50 wt. % (meth)acrylic acid, (m) 0–20 wt. % hydroxyalkyl (meth)acrylate, and (n) 0–20 wt. % of a copolymerizable monoethylenically unsaturated monomer other than (j), (k) or (m), the sum of the wt. % indicated for monomers (j), (k), (m), and (n) always being 100 wt. %, and (iv) 0.01–0.5 parts by weight (calculated on 100 parts by weight of the total addition polymer (II)) of a compound having at least two unsaturated groups, with the carboxylic acid groups derived from the (meth) acrylic acid being at least partially neutralized.

2. An aqueous coating composition according to claim 1 wherein monomer mixture A consists of (i) 80–100 mole % of a mixture of (a) 30–95 mole % of a (cyclo)alkyl (meth)acrylate of which the (cyclo)alkyl group contains 4–12 carbon atoms, (b) 0–50 mole % styrene, (c) 5–12 mole % hydroxy alkyl (meth)acrylate, and (d) 0–8 mole % of a di(cyclo)alkyl maleate and/or fumarate of which the (cyclo)alkyl groups contain 4–12 carbon atoms, and (ii) 0–20 mole % of a different copolymerizable monoethylenically unsaturated monomer.

3. An aqueous coating composition according claim 1 wherein monomer mixture B consists of (e) 5–8 mole % (meth)acrylic acid, (f) 5–12 mole % hydroxy alkyl (meth)acrylate, (g) 0–30 mole % styrene, and (h) 50–90 mole % of a different copolymerizable monoethylenically unsaturated monomer.

4. An aqueous coating composition according claim 1 wherein the total amount of (meth)acrylic acid in 100 parts of the total addition polymer (I) is between 0.5–1.4 wt. %.

5. An aqueous coating composition according claim 1 wherein monomer mixture C consists of (j) 50–70 wt. % (cyclo)alkyl (meth)acrylate, (k) 30–40 wt. % (meth)acrylic acid, (m) 0–5 wt. % hydroxyalkyl (meth)acrylate, and (n) 0–5 wt. % of a different copolymerizable monoethylenically unsaturated monomer.

6. An aqueous coating composition according claim 1 wherein the polymer dispersion (II) is prepared by emulsion polymerization of (iii) 99.85–99.95 parts by weight of monomer mixture C and (iv) 0.05–0.15 parts by weight of a compound having at least two unsaturated groups.

7. An aqueous coating composition according claim 1 wherein the compound having at least two unsaturated groups has at least one allylic group.

8. An aqueous coating composition according to claim 7, wherein the compound having at least two unsaturated groups is selected from diallyl phthalate, allyl methacrylate, and triallyl isocyanurate.

9. An aqueous coating composition according to claim 1, wherein the filmforming binder composition comprises, in addition to the alkali non-swellable core-shell addition polymer dispersion (I), at least one water-dilutable material.

10. An aqueous coating composition according to claim 9, wherein the filmforming binder composition may comprise 0.1 to 99.9 wt. % of the alkali non-swellable core-shell addition polymer dispersion (I) and 99.9 to 0.1 wt. % of at least one water dilutable material, wherein the sum of the wt. % indicated for dispersion (I) and the water dilutable material(s) is always 100 wt. %.

11. An aqueous coating composition according to claim 9 wherein the water dilutable material is selected from alkyd resins, polyesters, polyurethanes, and mixtures thereof.

12. An aqueous coating composition according to claim 11 wherein the water dilutable material is polyurethane.

13. A base coat composition comprising an aqueous coating composition according to claim 1.

14. Use of the basecoat composition of claim 13 in the refinishing of cars, the finishing of trucks, buses, trains, and aeroplanes, and the finishing of cars.

* * * * *

UNITED STATES PATENT AND TRADEMARK OFFICE
CERTIFICATE OF CORRECTION

PATENT NO.  : 6,376,575 B2
DATED       : April 23, 2002
INVENTOR(S) : Buter et al.

It is certified that error appears in the above-identified patent and that said Letters Patent is hereby corrected as shown below:

<u>Column 18,</u>
Lines 53-55, Claim 14 should read:

A method of using the basecoat composition of claim 13 comprising applying the composition to a substrate in the finishing and refinishing of cars, trucks, buses, trains, and aeroplanes.

Signed and Sealed this

Eleventh Day of March, 2003

JAMES E. ROGAN
*Director of the United States Patent and Trademark Office*